(12) United States Patent
Thapa

(10) Patent No.: US 8,243,119 B2
(45) Date of Patent: Aug. 14, 2012

(54) RECORDING AND VIDEOMAIL FOR VIDEO CONFERENCING CALL SYSTEMS

(75) Inventor: Mukund N. Thapa, Palo Alto, CA (US)

(73) Assignee: Optical Fusion Inc., Palo Alto, CA (US)

( * ) Notice: Subject to any disclaimer, the term of this patent is extended or adjusted under 35 U.S.C. 154(b) by 1021 days.

(21) Appl. No.: 12/130,787

(22) Filed: May 30, 2008

(65) Prior Publication Data

US 2009/0086012 A1     Apr. 2, 2009

Related U.S. Application Data

(60) Provisional application No. 60/976,464, filed on Sep. 30, 2007.

(51) Int. Cl.
H04N 7/14 (2006.01)

(52) U.S. Cl. .................... 348/14.08; 348/14.09

(58) Field of Classification Search ..... 348/14.01–14.16
See application file for complete search history.

(56) References Cited

U.S. PATENT DOCUMENTS

| | | | |
|---|---|---|---|
| 4,720,850 A | 1/1988 | Oberlander et al. |
| 5,689,641 A | 11/1997 | Ludwig et al. |
| 5,973,724 A | 10/1999 | Riddle |
| 6,603,450 B1 | 8/2003 | Yamazaki et al. |
| 2003/0043260 A1 | 3/2003 | Yap et al. |
| 2003/0174826 A1 | 9/2003 | Hesse |
| 2005/0099492 A1 | 5/2005 | Orr |
| 2005/0213739 A1 | 9/2005 | Rodman et al. |
| 2005/0237377 A1 | 10/2005 | Chapweske et al. |
| 2005/0248652 A1 | 11/2005 | Firestone et al. |
| 2005/0256925 A1 | 11/2005 | Luo et al. |
| 2006/0031290 A1 | 2/2006 | Mannaru et al. |
| 2006/0050155 A1 | 3/2006 | Ing et al. |
| 2007/0093238 A1 | 4/2007 | Lin |
| 2007/0188597 A1 | 8/2007 | Kenoyer |
| 2008/0037580 A1 | 2/2008 | Shaffer et al. |
| 2008/0088698 A1 | 4/2008 | Patel et al. |
| 2008/0100694 A1 | 5/2008 | Barkley et al. |
| 2008/0117838 A1 | 5/2008 | Yee et al. |
| 2008/0284841 A1 | 11/2008 | Modai et al. |

OTHER PUBLICATIONS

PCT International Search Report and Written Opinion, PCT/US08/78203, Dec. 2, 2008, 8 pages.
PCT International Search Report and Written Opinion, PCT/US08/78196, Dec. 2, 2008, 10 pages.
PCT International Search Report and Written Opinion, PCT/US08/78206, Dec. 2, 2008, 7 pages.
PCT International Search Report and Written Opinion, PCT/US08/78326, Dec. 12, 2008, 8 pages.
Singh, K.N., "Reliable, Scalable and Interoperable Telephony," Columbia University Thesis, 2006, copyright 2006, [Online] [Retrieved on Nov. 23, 2008] Retrieved from the Internet<URL:http://www1.cs.columbia.edu/-kns10/publication/thesis.pdf>.

*Primary Examiner* — Suhan Ni
(74) *Attorney, Agent, or Firm* — Fenwick & West LLP

(57) ABSTRACT

In one aspect, a request to initiate a video conference is received from a caller. The request identifies one or more called parties for the video conference. A request for the video conference is sent to one of the called parties. The called party does not accept the request. In response to a lack of acceptance of the request by the called party, a videomail service is provided. A videomail message from the caller is recorded. The caller is the sender of the videomail message and the called party is the recipient of the videomail message. The called party is notified that he has a videomail message.

30 Claims, 18 Drawing Sheets

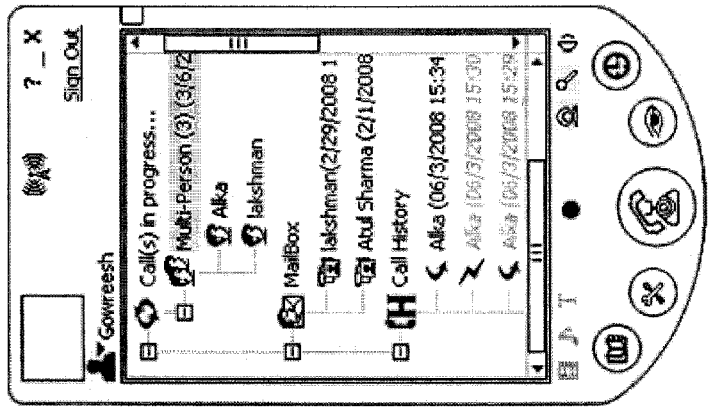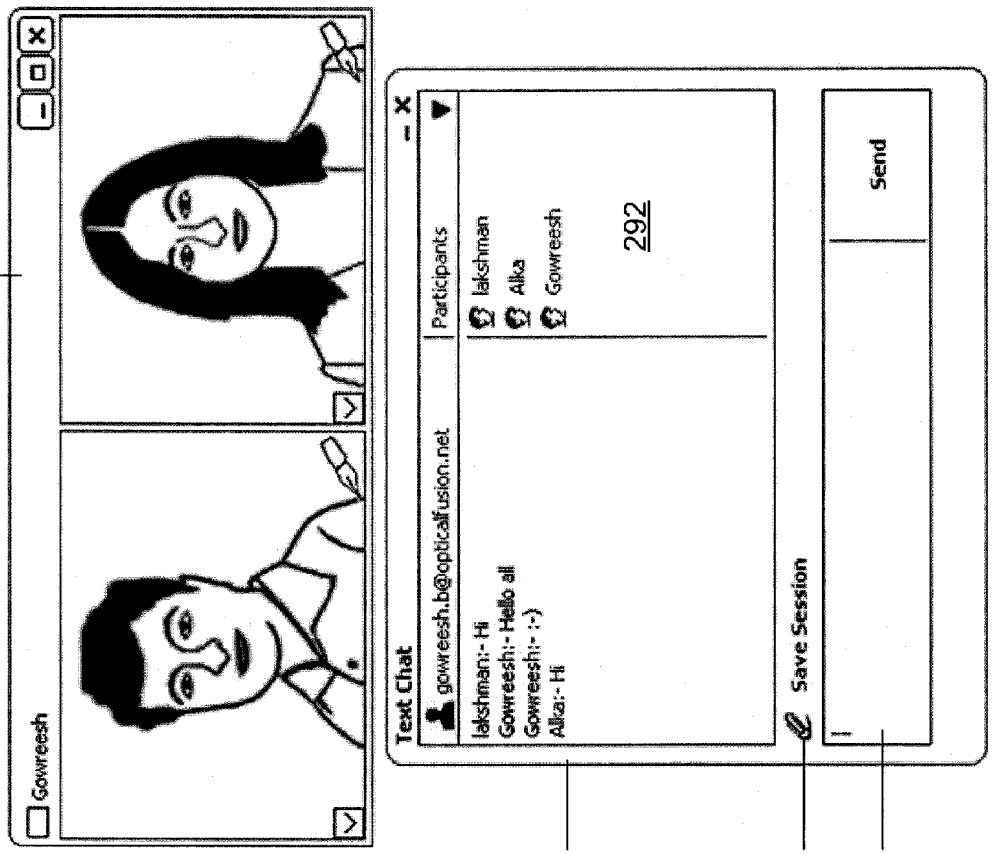
FIG. 21

RECORDING AND VIDEOMAIL FOR VIDEO CONFERENCING CALL SYSTEMS

CROSS REFERENCE TO RELATED APPLICATIONS

This application claims the benefit of U.S. Provisional Application No. 60/976,464, "Video Conference User Interface and Features" by Mukund Thapa filed on Sep. 30, 2007, and which is incorporated by reference herein in its entirety.

BACKGROUND OF THE INVENTION

1. Field of the Invention

The present invention relates generally to video conferencing over a network. In particular, the present invention is directed towards video "voicemail" (i.e., videomail) for such video conferencing systems.

2. Description of Background Art

Conventional video conferencing technologies are generally cumbersome and unnatural for users. They can also require specialized equipment or connections, thus making the video conference expensive and limiting participation only to those who have the specialized equipment and connections. For example, it is not unusual for video conferencing capabilities within a company to be based on a specialized system. The company spends a significant amount of money to purchase a limited number of specialized video conferencing equipment. This equipment is set up by the company's IT staff in specific rooms that support video conferencing. Groups who desire to have a video conference then book these rooms in advance. Details of the video conference are given to the IT staff, who make the necessary preparations in advance. At the scheduled time and only at the scheduled time, the video conference takes place, if there are no problems. If there are problems, everyone waits around until IT fixes the problem. In addition, the video conferencing service may require access to special data networks, for which the company must pay additional fees.

Compare this to the process of making a phone call. Phones, whether they are land lines or mobile phones, are relatively inexpensive. As a result, they are everywhere and they are simple to use. Any person can make a phone call to any other person at any time, simply by picking up the phone and dialing the other person's phone number. Capabilities such as multi-party calls, caller ID, and voicemail are also generally available and simple to use.

Thus, there is a need for additional video conferencing capabilities that are simple to use, including capabilities such as videomail, multi-party calls, caller ID and/or recording of video conferences.

SUMMARY OF THE INVENTION

The present invention overcomes limitations of the prior art by providing easy to use videomail and/or recording options for video conferencing systems. In one aspect, videomail is implemented as follows. A caller makes a video conference call to one or more called parties for the video conference. Suppose that one of the called parties does not accept the video conference call and does not join the video conference. In response, a videomail service is provided to the caller. A videomail message from the caller is recorded. The caller is the sender of the videomail message and the non-participating called party is the recipient of the videomail message. The videomail message is "sent" to the called party. "Sending a videomail message" is not meant to imply that the videomail message must be physically transmitted to the recipient's machine. For example, a videomail message can be sent to a recipient by notifying him that he has a videomail message, but where the videomail message is stored on a central server for later retrieval.

In one aspect, the videomail message can include some or all of a recorded video conference. For example, the caller may initially make a video conference call to two or more called parties. Some of the called parties may accept the call, and a video conference is initiated between the caller and those called parties. At the same time, the video conference may also be recorded as a videomail message. The videomail message can then be sent to the non-participating called parties, and possibly also to others. These users can then view the videomail message (i.e., the recording of the video conference) at a later time.

The recording of video conferences can also be initiated in response to events other than participants not being able to join the video conference. For example, any of the participants (or even non-participants) may be given the ability to record a video conference and/or to send the corresponding videomail message to others.

Various features allow the sender to edit the videomail message before sending to the recipient. For example, the videomail service may permit the sender to cancel the recorded videomail message before sending. Upon cancellation, the called party may be notified that he missed a video conference call, rather than being notified of a videomail message. Another feature permits recipients to forward videomail messages. The sender may be permitted to control the forwarding of videomail messages by, for example, limiting the distribution of the videomail message, limiting the number of times the videomail message is forwarded, or limiting a lifetime of the videomail message. The videomail service may also permit the sender to set various permissions for the videomail message.

Notification of the recipient can also occur at various times. In one approach, the videomail message is completed before the recipient is notified that he has videomail. In an alternate approach, the recipient is notified before recording of the videomail message has been completed. In this case, the videomail service may also permit the recipient to begin play back of the videomail message before recording of the videomail message has been completed. The videomail service may also allow the recipient to "pick up" the videoconference call with the person leaving the message. In a one-to-one call (i.e., sender of the message is calling only the recipient), the recipient's picking up the call could automatically terminate the recording of the videomail message. In a multi-party call, the videomail service may also allow the recipient to join the video conference call in progress and terminate the recording of the videomail message with respect to the recipient.

Other aspects of the invention concern the graphical user interface for display and/or play back of videomail messages. In one aspect, the graphical user interface includes a main communicator element and a message center. The main communicator element includes top-level controls for video conferencing. The message center identifies received videomail messages. Upon selection from the message center, the selected videomail message is played back within a playback window. In one implementation, the message center can be docked or undocked. When docked, the message center is displayed within the main communicator element. When undocked, it is displayed in a window separate from the main communicator element. Similarly, in another feature, the playback window can be docked (displayed within the main communicator element) or undocked (displayed in a window separate from the main communicator element). In one design, when a videomail message is selected for play back, it automatically plays back in an undocked playback window.

Additional features allow the recipient to reply all or to call all, in response to a videomail message. For example, activating a "reply all" button in the user interface may permit the recipient to send a reply videomail message to the other senders and recipients (i.e., the other addressees) on the videomail message. Activating a "call all" button may permit the recipient to make a video conference call to the other addressees on the videomail message.

Another aspect of the invention is the recording of a video conference, independent of whether used as videomail. The participants preferably are notified if the video conference is being recorded. The participants may be given the opportunity to opt out of the recording, or only selected participants may be recorded. In many situations, it is advantageous to record separate video and audio streams for different participants in the video conference (although this is not required). In this way, the streams for different participants can be individually controlled on play back, the same as would be the case during the original broadcast of the video conference.

Additional aspects include optional text chat and private communications and messages between participants (or subsets of participants) on the video conference.

Other aspects of the invention include software, systems and components of systems for implementing the techniques described above. Yet additional aspects include methods and applications for all of the foregoing.

BRIEF DESCRIPTION OF THE DRAWINGS

FIGS. 2A-2I are a series of screen shots illustrating a user interface for a video conference.

DETAILED DESCRIPTION OF THE PREFERRED EMBODIMENTS

Figure 1:
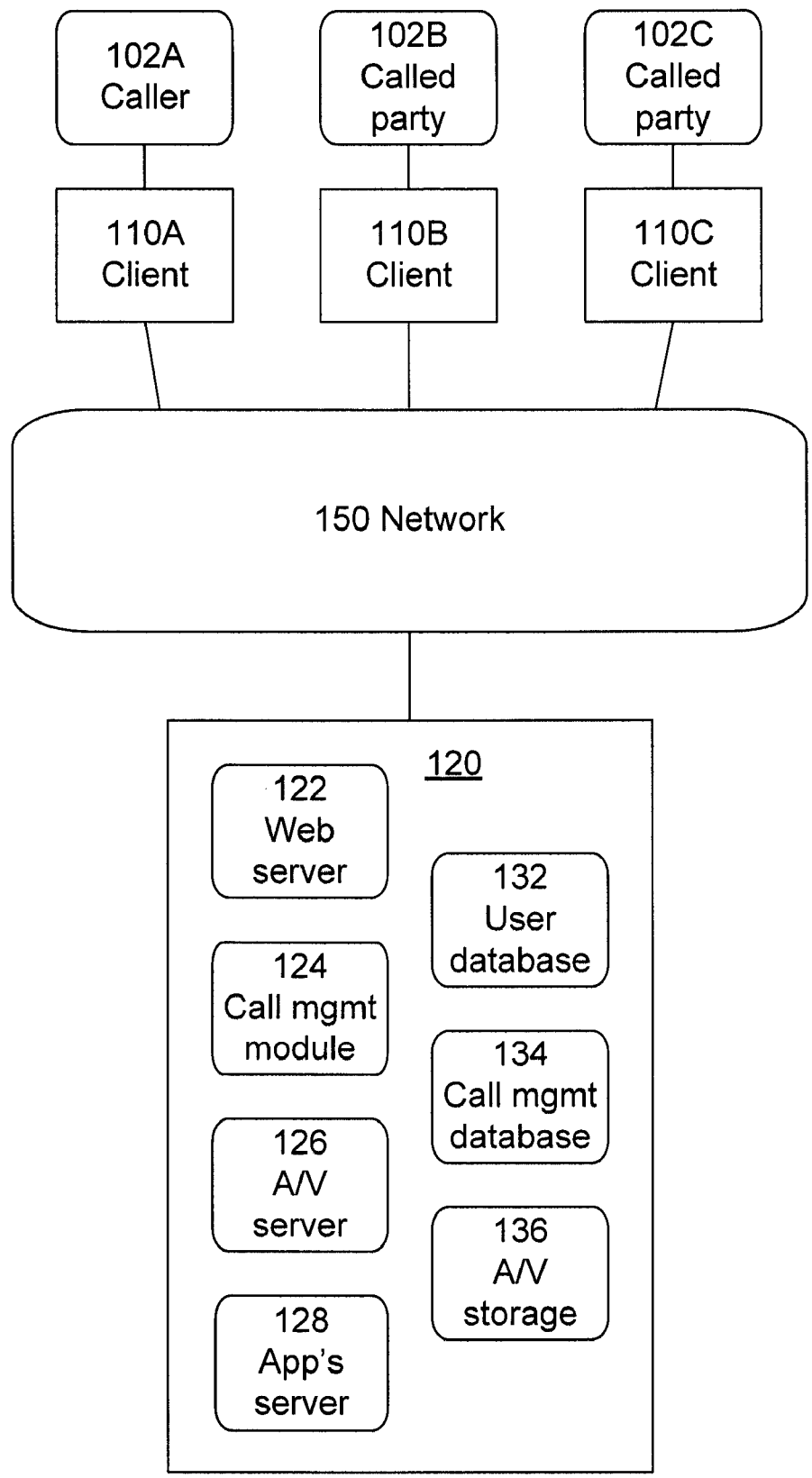
FIG. 1 is a block diagram of a server-based architecture suitable for use with the invention.

FIG. 1 is a block diagram of a server-based video conferencing architecture suitable for use with the invention. In this example, a participant 102A desires to have a video conference with two other participants 102B,102C. For convenience, participant 102A will be referred to as the caller and participants 102B,102C as the called parties. The caller 102A initiates the video conference by making a video conference call to the called parties 102B,102C. The called parties 102B, 102C join the video conference by accepting caller 102A's video conference call.

Each participant is operating a client device 110, which connects via a network 150 to a central server 120. In this server-based architecture, the server 120 coordinates the set up and tear down of the video conference. In this particular example, each client 110 is a computer that runs client software with video conferencing capability. To allow full video and audio capability, each client 110 preferably includes at least one camera (for video capture), display (for video play back), microphone (for audio capture) and speaker (for audio play back).

The clients 110 are connected via the Internet to the central server 120. In this example, the central server 120 includes a web server 122, a call management module 124, an audio/video server 126 and an applications server 128. The server 120 also includes user database 132, call management database 134 and audio/video storage 136. The participants 102 have previously registered and their records are stored in user database 132. The web server 122 handles the web interface to the clients 110. The call management module 124 and call management database 134 manage the video conference calls, including the set up and tear down of calls. For example, the call management database 134 includes records of who is currently participating on which video conference calls. It may also include records of who is currently logged in and available for calls and/or their video conferencing capabilities. The audio/video server 126 manages the audio and video streams for these calls. Streaming technologies, as well as other technologies, can be used. Storage of audio and video at the server is handled by audio/video storage 136. The application server 128 invokes other applications (not shown) as required.

Figure 2B:
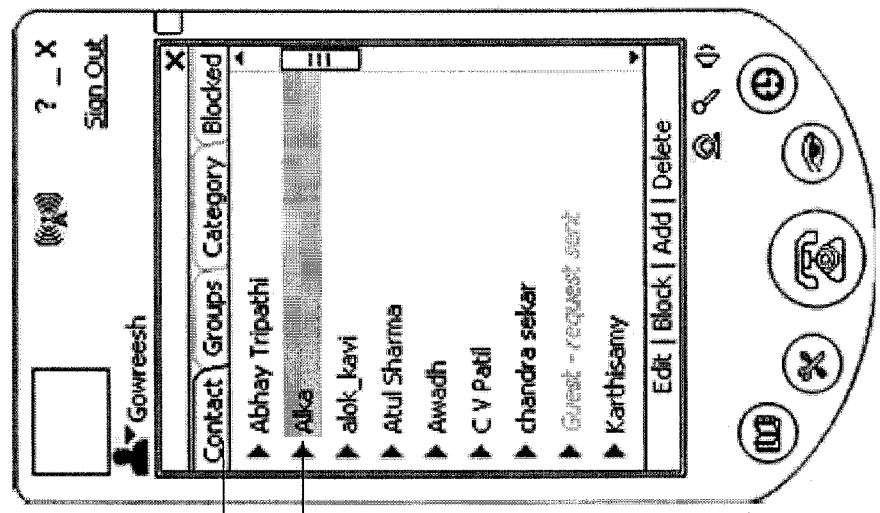
Figure 2A:
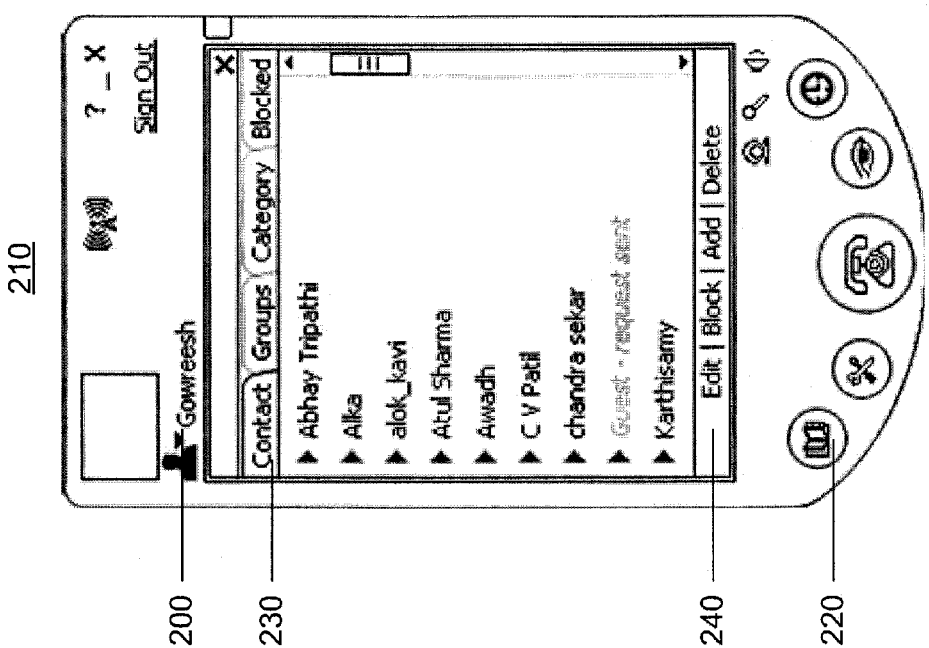

FIGS. 2A-2G are a series of screen shots illustrating a user interface for a video conference using the system shown in FIG. 1. FIG. 2A is a screen shot of the top level of the user interface. The main part of the user interface will be referred to as the main communicator element 210. It includes top level controls for video conferencing. These controls typically are either displayed as graphical elements or implemented as part of pull-down menus (or other similar user interface components). In this example, the buttons 220, tabs 230, toolbar 240, arrow 202 (allows selection of status) and icons 222 are some of the controls. The user in this example is Gowreesh, as indicated by 200.

Figure 2D:
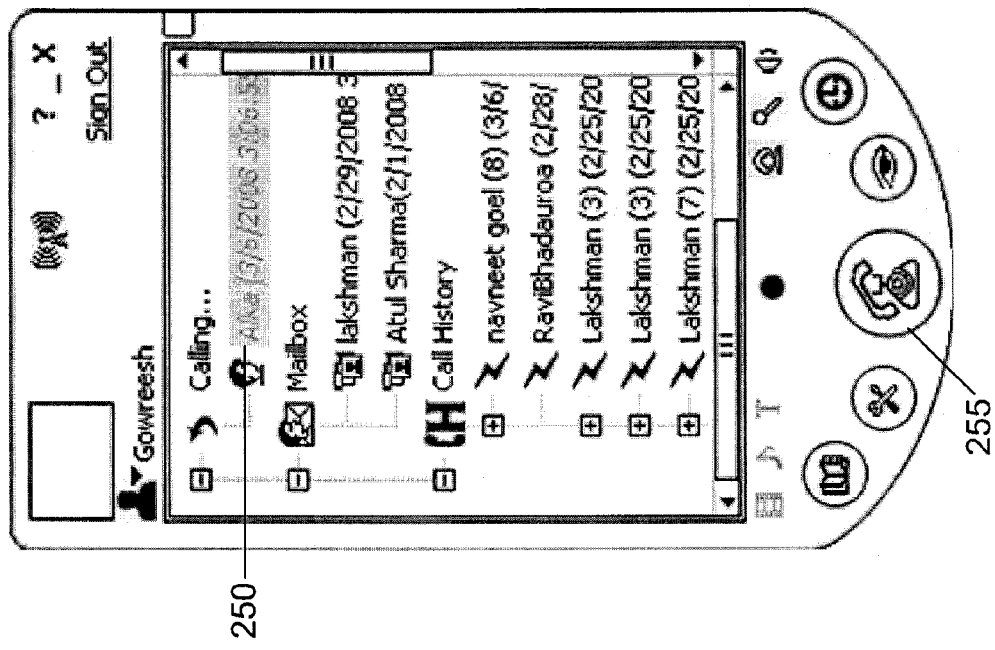
Figure 2C:
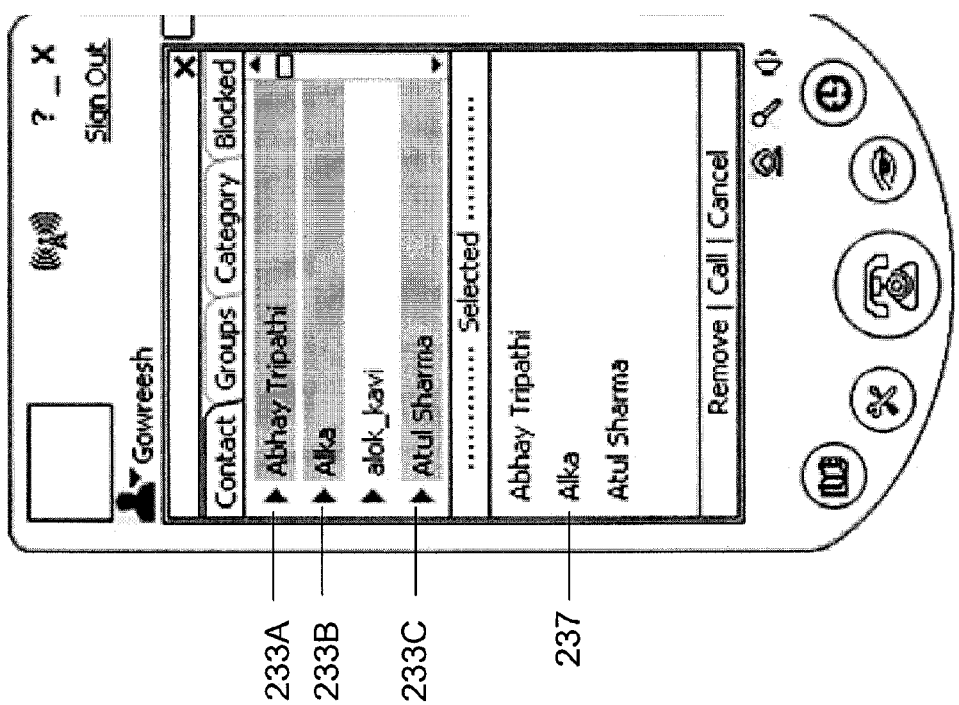

To begin the video conferencing process, the caller 102A selects the other participants 102B,102C for the video conference. In FIGS. 2B and 2C, the caller 102A selects the other participants 102B,102C from his address book (tab 232). In FIG. 2B, the caller 102A (Gowreesh) is selecting Alka 233, as shown by the highlighting of this contact. In FIG. 2C, the caller Gowreesh has selected multiple other participants: Abhay, Alka and Atul, as indicated by the highlighted contacts 233A,B,C. The currently selected participants are also shown in area 237. When the caller is finished selecting participants, the caller initiates the video conference call, which sends the list of selected participants from client 110A to the server 120.

The caller 102A makes the video conference call by activating the call button 225, which is prominently placed due to its importance. FIG. 2D shows a screen shot where the caller's communicator 210 has an indication 250 that a video conference call is being placed to Alka. Naturally, although FIG. 2D shows a call being placed only to Alka, the video conference call can be placed to more than one person at a time.

The server 120 begins to set up the call by creating an entry for the new video conference in a call table within the call management database 134. In one implementation, this entry includes a unique Conference ID to identify the new video conference, possibly a Conference Name, a conference type (e.g., public, private or hidden), and a conference administrative ID corresponding to the caller 102A. The server 120 also inserts the list of participant ID's into the conference, in this example implementation by use of a user table that includes Conference ID, user ID and a/v capability (e.g., audio, video and/or text). The server 120 obtains the IP address, login port number and session ID for participants from a table of logged in users, which may also be maintained as part of the call management database 134.

Figure 2E:
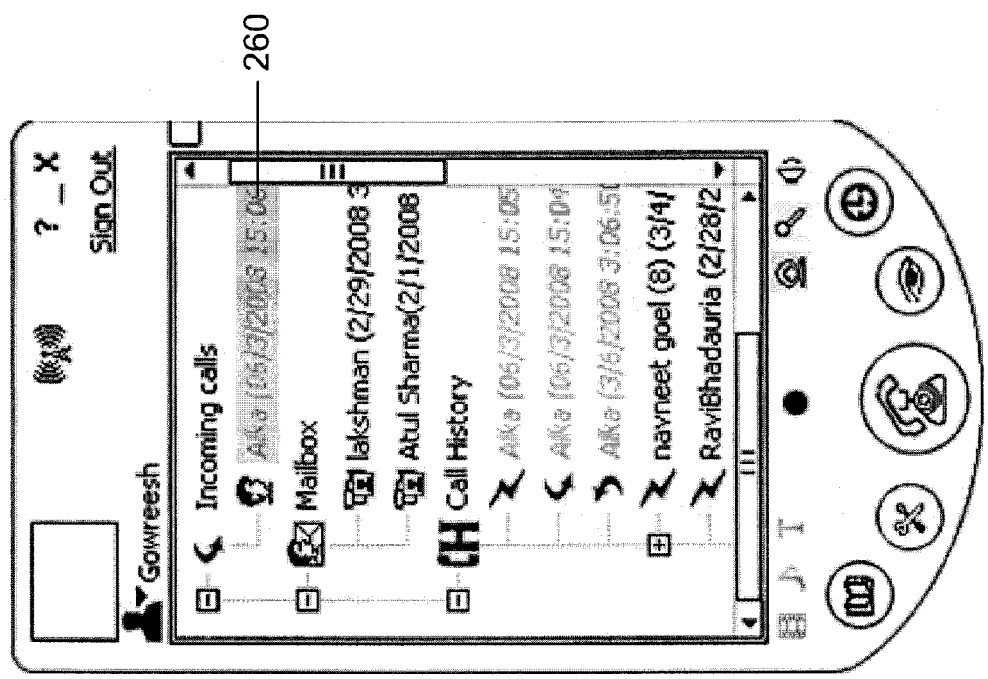

Assuming the called parties 102B,102C are logged on, the server 120 sends an initial request to their clients 110B,110C. This could be in the form of a ring, for example. FIG. 2E shows a screen shot of a called party receiving notification 260 of an incoming call. Note that, in this example, Gowreesh and Alka have changed roles. FIG. 2E still shows Gowreesh's communicator. However, Alka is the caller and Gowreesh is the called party. The communicator shows 260 that Alka is calling Gowreesh.

Figure 2F:
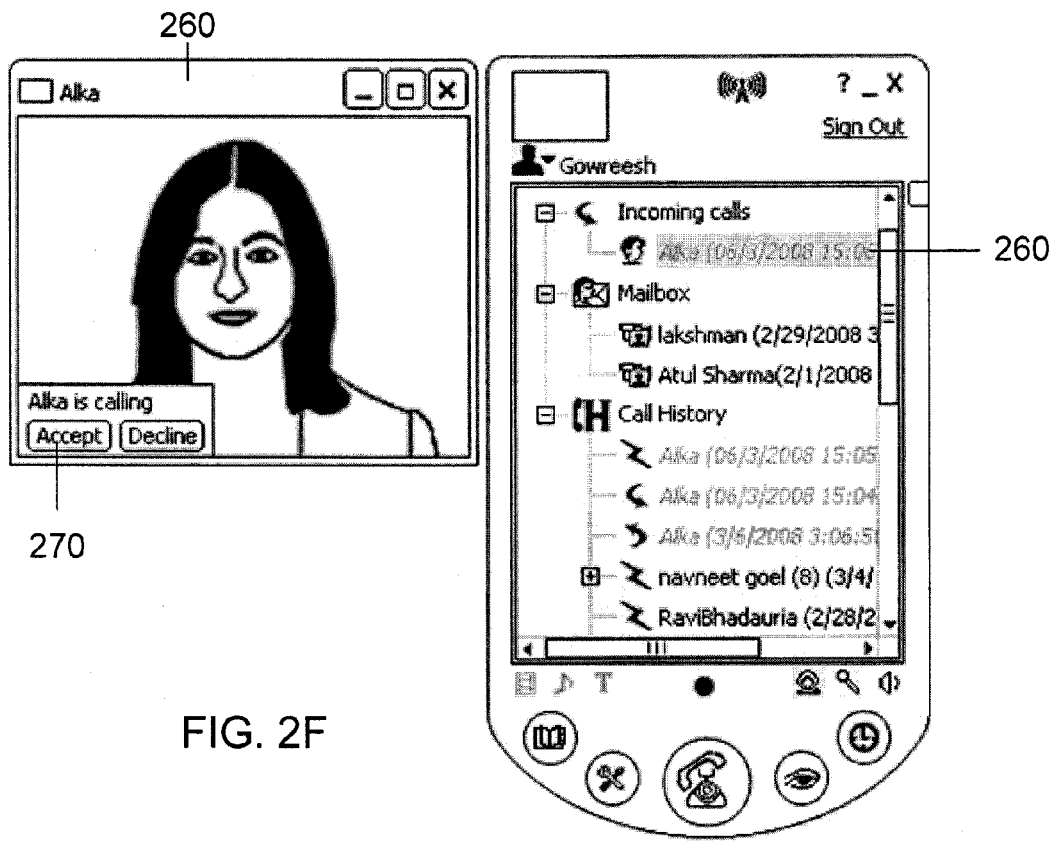

In FIG. 2F, the notification 260 also includes a window showing the caller. The called party can accept the call and join the video conference by activating the accept button 270. Once the called party joins the video conference, the other participants 102 are made aware of his presence. At the server 120, the call table is updated to include the participant that accepted. As a result, the server 120 now routes video and audio to and from the new participant.

Figure 2G:
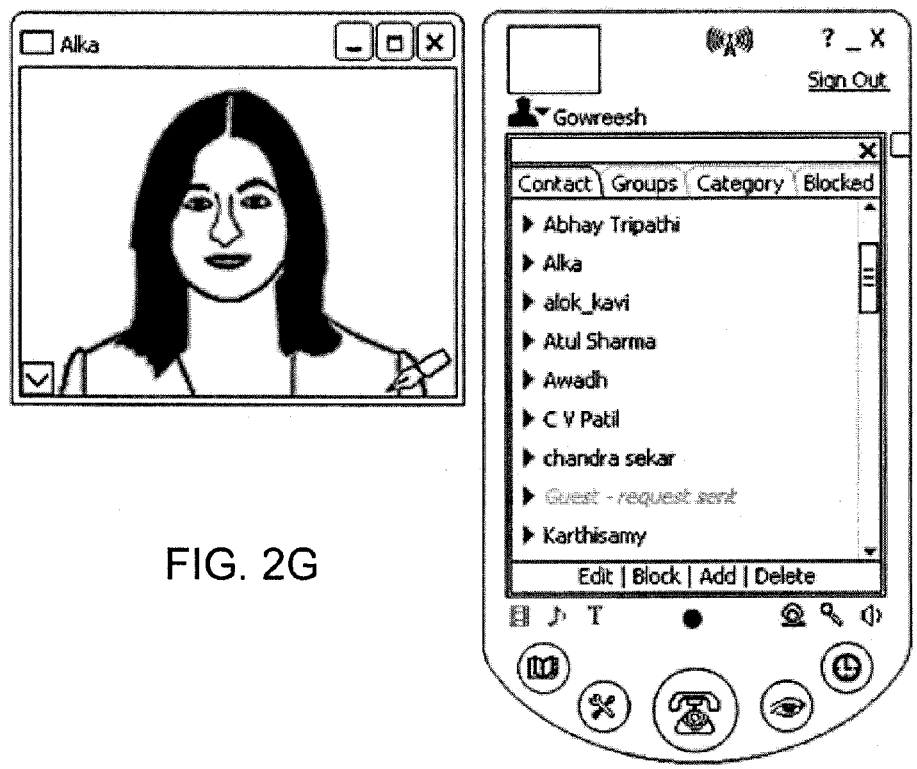
Figure 2H:
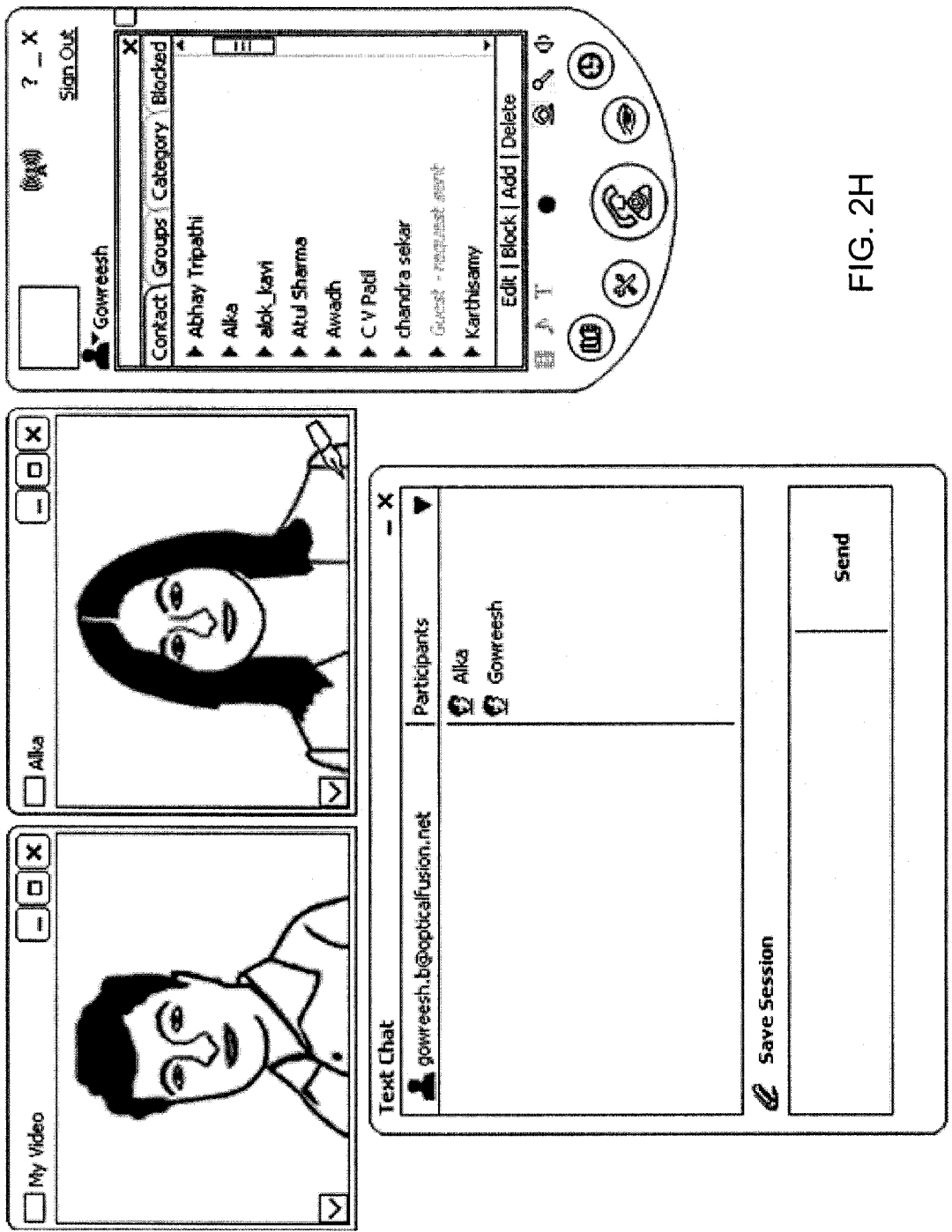

FIGS. 2G-2I show screen shots of a video conference. In FIG. 2G, there is one other participant, Alka, in addition to the caller Gowreesh. FIG. 2H is an alternate interface that shows Gowreesh in addition to Alka. In FIG. 2I, a third participant Lakshman has joined the video conference call. FIG. 2I shows the main communicator element 210, a video conference window 280 that shows both of the other participants, and a third window 290.

This ancillary window 290 shows the current participants 292 and also provides for text chat. The participant's text chat is entered in area 293. Text chat can be shared between all participants or only between some participants (i.e., private side conversations). In the examples of FIGS. 2H and 2I, text chat is automatically set up between all active participants. In addition to text, files can also be shared by clicking on the attachment icon 295. Text chat and attachments can be saved.

FIGS. 1-2 illustrate one example, but the invention is not limited to these specifics. For example, client devices other than a computer running client software can be used. Examples include PDAs, mobile phones, web-enabled TV, and SIP phones and terminals (i.e., phone-type devices using the SIP protocol that typically have a small video screen and audio capability). In addition, not every device need have both audio and video and both input and output. Some participants may participate with audio only or video only, or be able to receive but not send audio/video or vice versa. The underlying architecture also need not be server-based. It could be peer-to-peer, or a combination of server and peer-to-peer. For example, participants that share a local network may communicate with each other on a peer-to-peer basis, but communicate with other participants via a server. Other variations will be apparent.

Returning to FIGS. 1-2, in some cases, the called party may not want to participate in the video conference or may not even be logged in to the server. When the called party does not accept the call, the server 120 can provide a videomail service to the caller. The caller can then leave a videomail message for the called party.

Figure 3B:
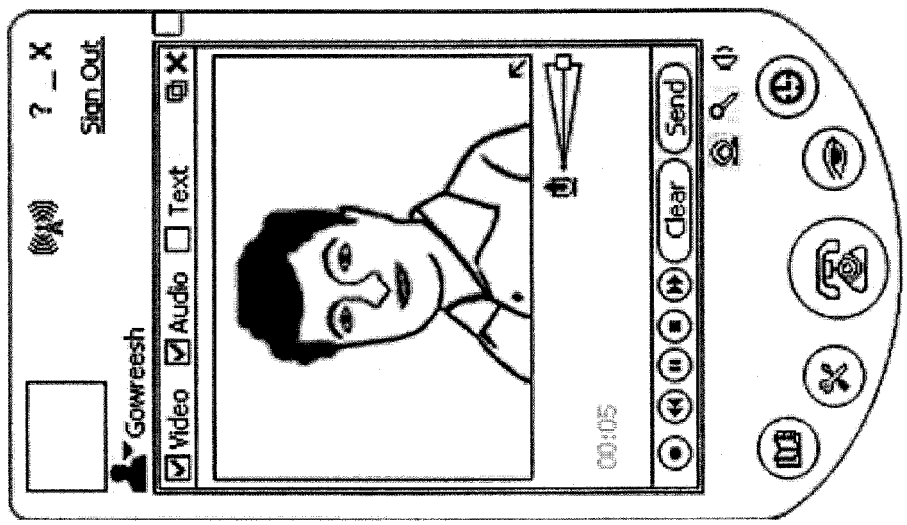
FIGS. 3A-3G are a series of screen shots illustrating a user interface for a videomail service.
Figure 3A:
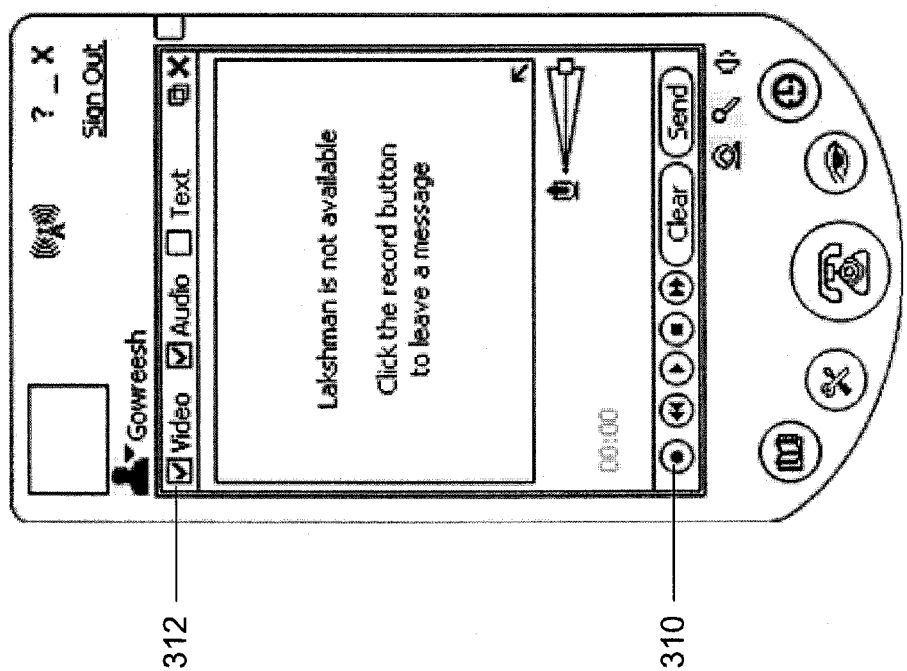
Figure 3C:
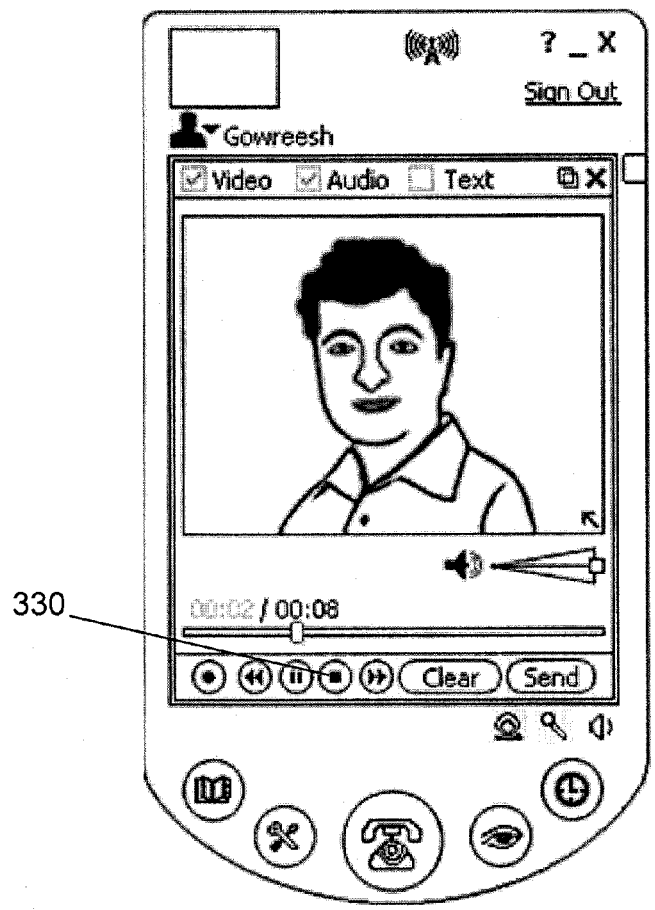

FIGS. 3A-3F are a series of screen shots illustrating an example user interface for a videomail service. In FIG. 3A, the caller Gowreesh has attempted to call Lakshman, but Laskhman is not available. The user interface allows the caller to record a videomail message for the called party. The caller can do so by activating the record button 310. Note that the check boxes 312 indicate that video and audio are active, but text is not. The caller records the videomail message. In this example, the caller records a short videomail message, informing the called party of the missed call. The videomail message is saved by the audio/video server 126. With respect to this videomail message, the caller is the sender of the message and the called party is the recipient of the message. FIG. 3B is a screen shot taken 00:05 into the recording of a videomail message. In FIG. 3C, the sender activates the stop button 330 to save the videomail message for delivery. The same videomail message can be sent to multiple recipients.

In this particular implementation, the sender can also edit his videomail message. For example, the sender might cancel the entire original recording and re-record a new videomail message. Alternately, the sender might cancel (and optionally re-record) only a portion of the original recording. Controls such as forward, rewind, fast forward, fast rewind, slow motion, define bookmarks, skip to bookmarks, etc. can be used to facilitate editing. Such controls are also available for play back. If the sender cancels the videomail message entirely, then the called party may be notified of a missed call (rather than a videomail message).

In addition to editing the content of the videomail message, the sender can also edit the properties of the videomail message. For example, the sender might limit re-distribution of the videomail message, or limit the number of times the videomail message can be forwarded, or define a specific lifetime for the videomail message. The sender might also set permissions for the videomail message, for example restricting access to only certain recipients or disabling edit rights.

Figure 3D:
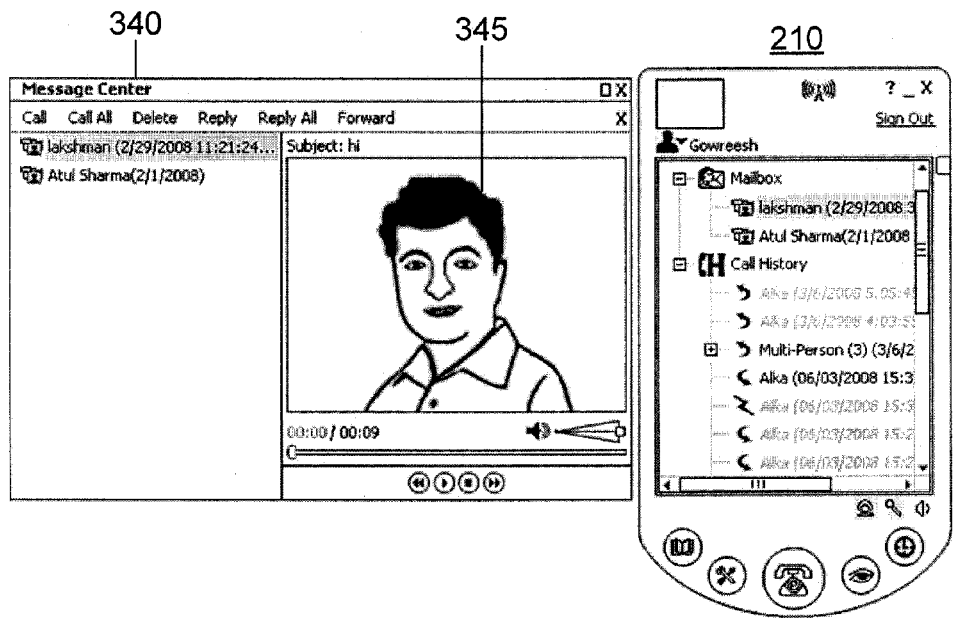
Figure 3F:
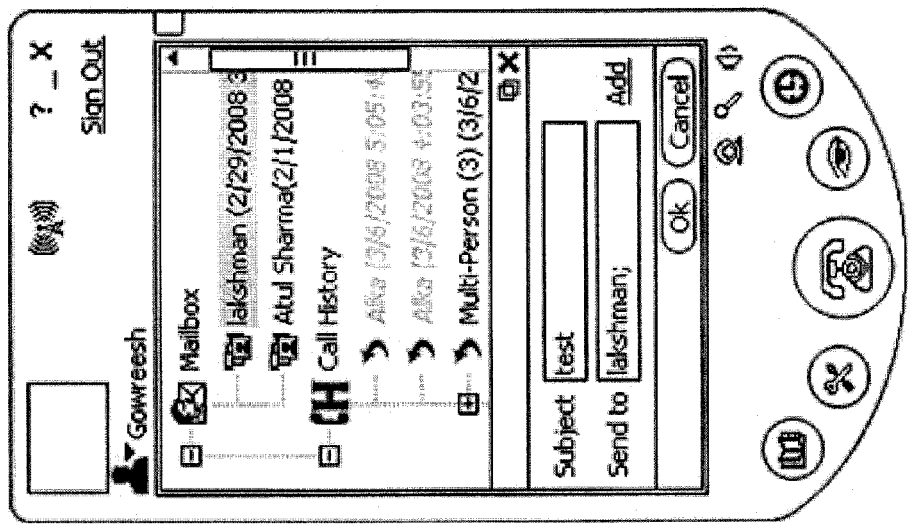

The server 120 notifies the recipient that he has a videomail message. FIG. 3D is a screen shot showing an example notification on the recipient's client 110. In this example, roles are reversed relative to FIGS. 3A-3C. Gowreesh's communicator is shown. Gowreesh is the recipient and Lakshman has left a videomail message for Gowreesh. In this case, the user interface includes a message center 340 that identifies received videomail messages, which are indicated by the video camera icon. Audio messages may be indicated by a speaker icon, and text messages by an envelope icon. Gowreesh's mailbox has two videomail messages, one from Lakshman and one from Atul Sharma. The videomail message can be played back by activating the identifier. In this example, the identifier for the Lakshman videomail message has been selected and the videomail message is starting play back. In this particular implementation, play back occurs within a playback window 345 that is separate from the main communicator 210.

Figure 3E:
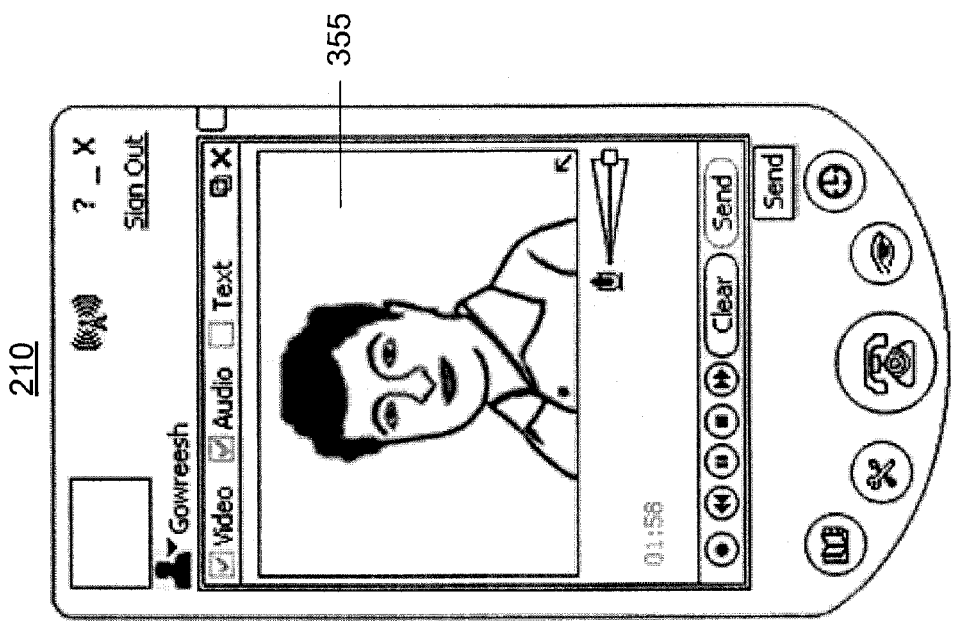

FIG. 3E shows an alternate play back mode, where the playback window 355 is located within the main communicator 210. The situation shown in FIG. 3E will be referred to as "docked" and the situation in FIG. 3D as "undocked." The message center itself can also be undocked (as in FIG. 3D) or docked (as in FIG. 3F). In one design, selecting a videomail message from the message center for play back will automatically undock the playback window for that videomail message.

The notification can be sent at different times. For example, notification can be sent only after the videomail message has been recorded. This is beneficial if the videomail message might be edited, or even cancelled, before sending. On the other hand, this approach introduces delay since the entire videomail message must be completed before the recipient is notified. Alternately, the recipient can be notified before recording is completed. The recipient could even be allowed to begin play back of the videomail message before recording is completed. Alternatively, the recipient, if logged in, can be informed that a message is being recorded. The recipient can click on the message notification in the communicator and join the call. If the recipient logs in while the message is being recorded, then the recipient is informed of such and can join the call as just described.

Figure 3G:
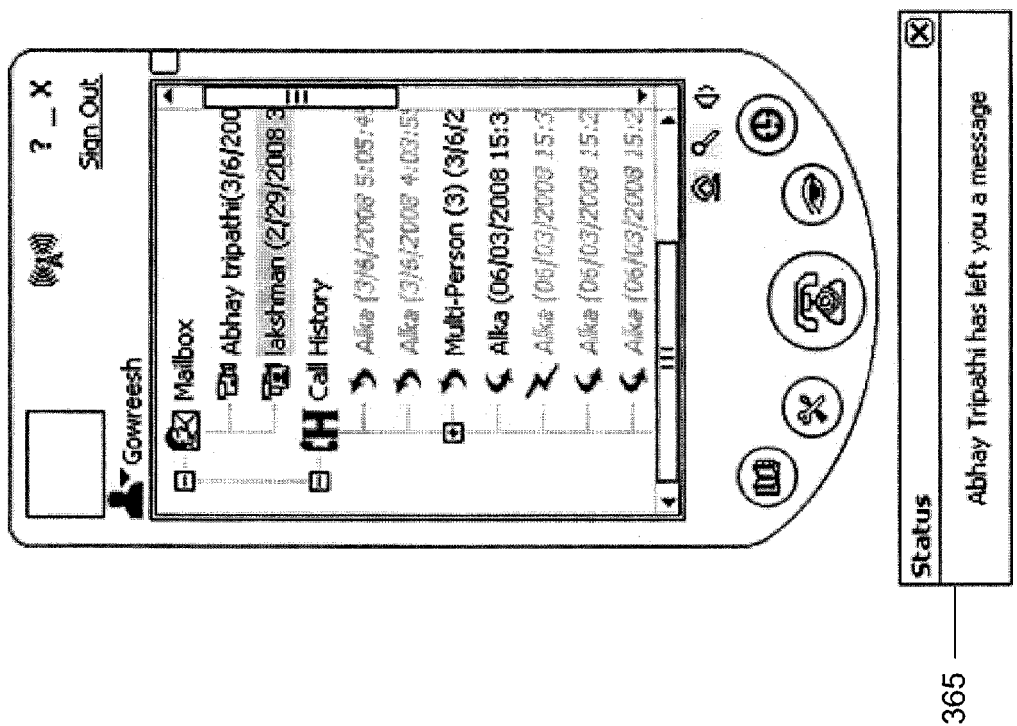

FIG. 3G shows another variation for notification. In this case, a pop-up message 365 contains the notification of a new videomail message. In an alternate approach, the pop-up message can be located within the communicator.

Figure 4A:
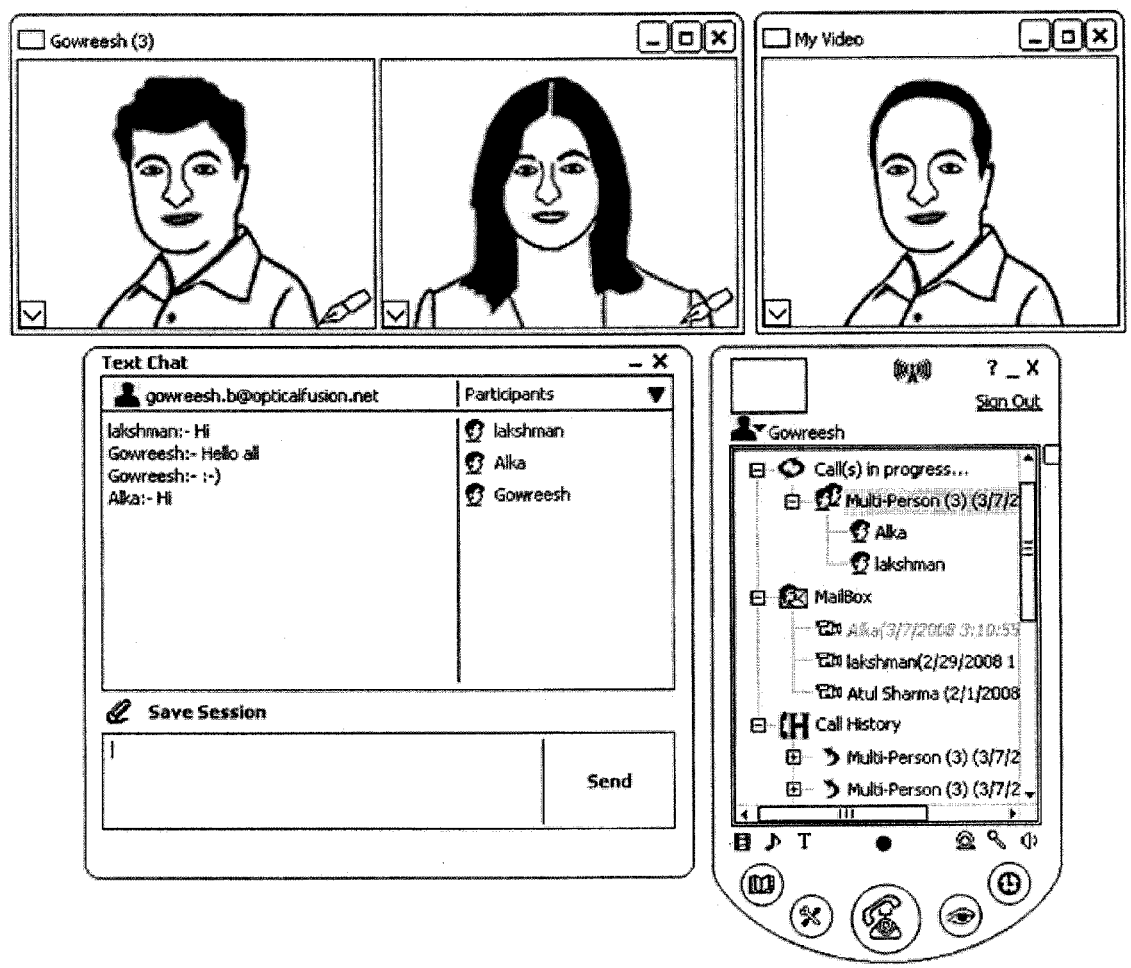
FIGS. 4A-4F are screen shots illustrating the sending of private messages.
Figure 4B:
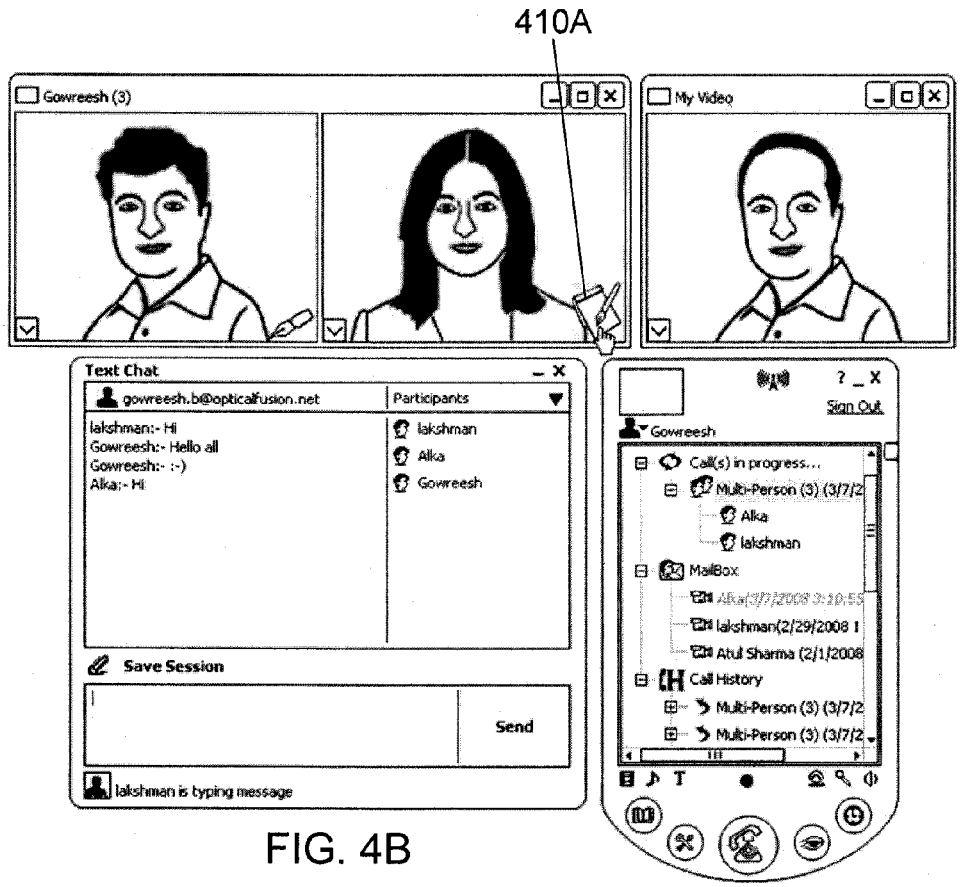
Figure 4C:
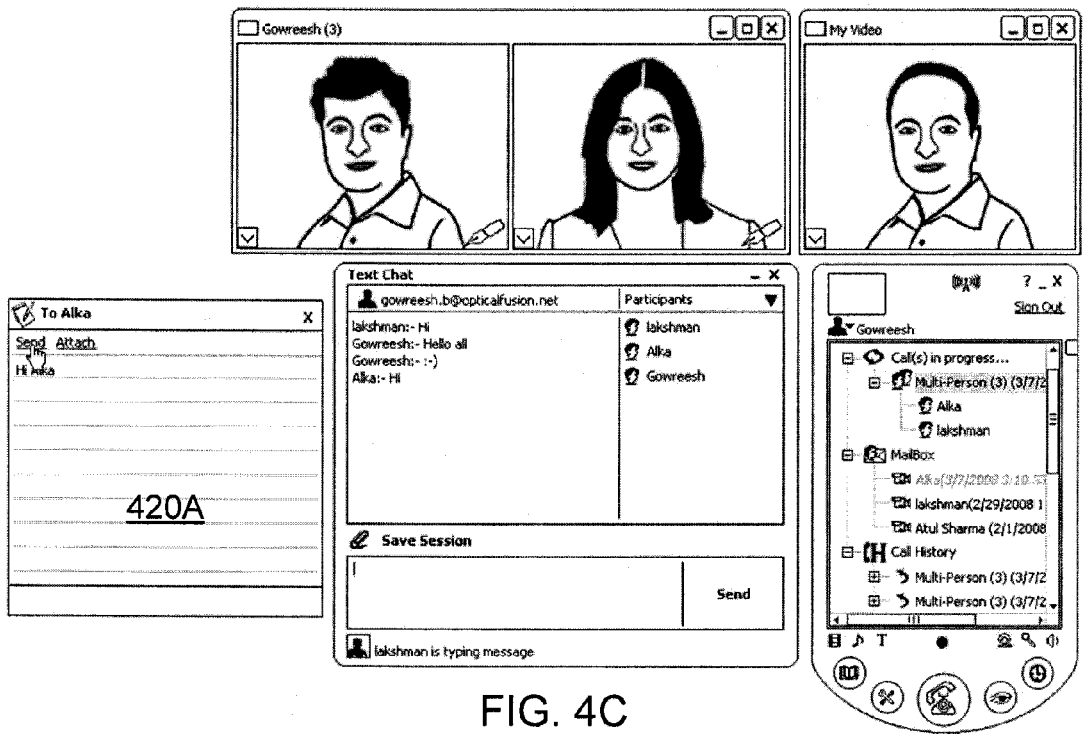
Figure 4D:
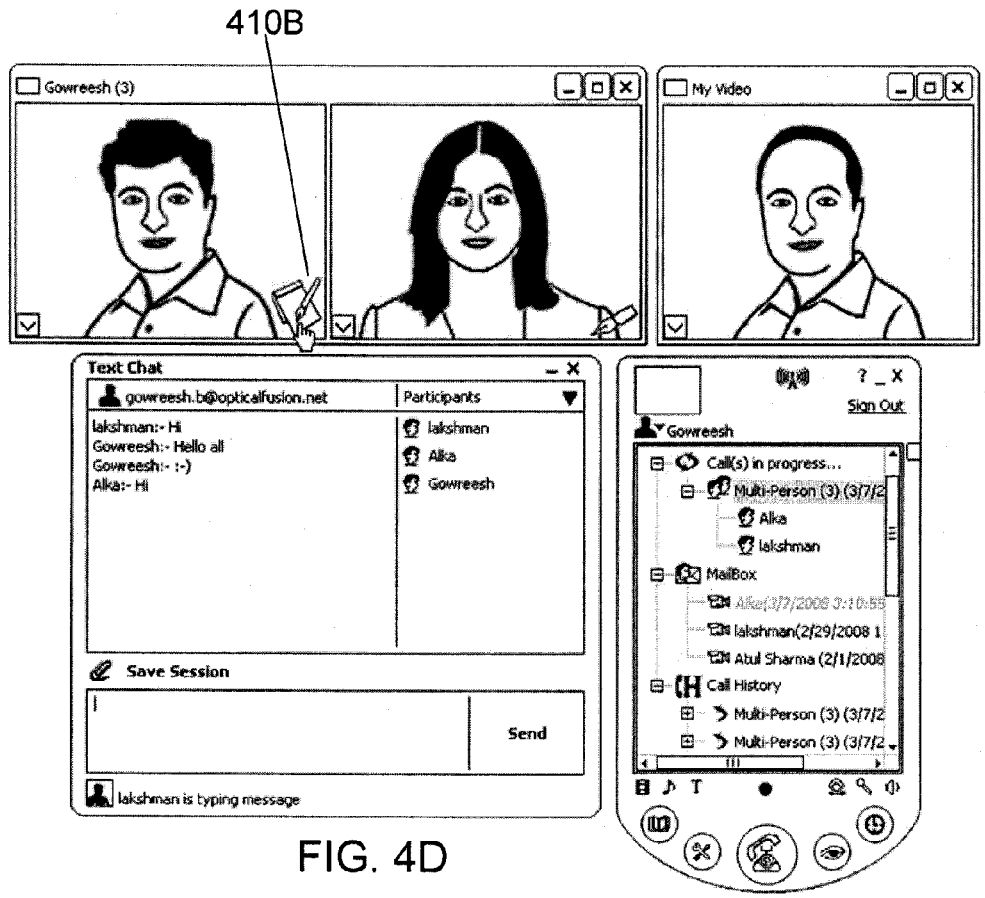
Figure 4E:
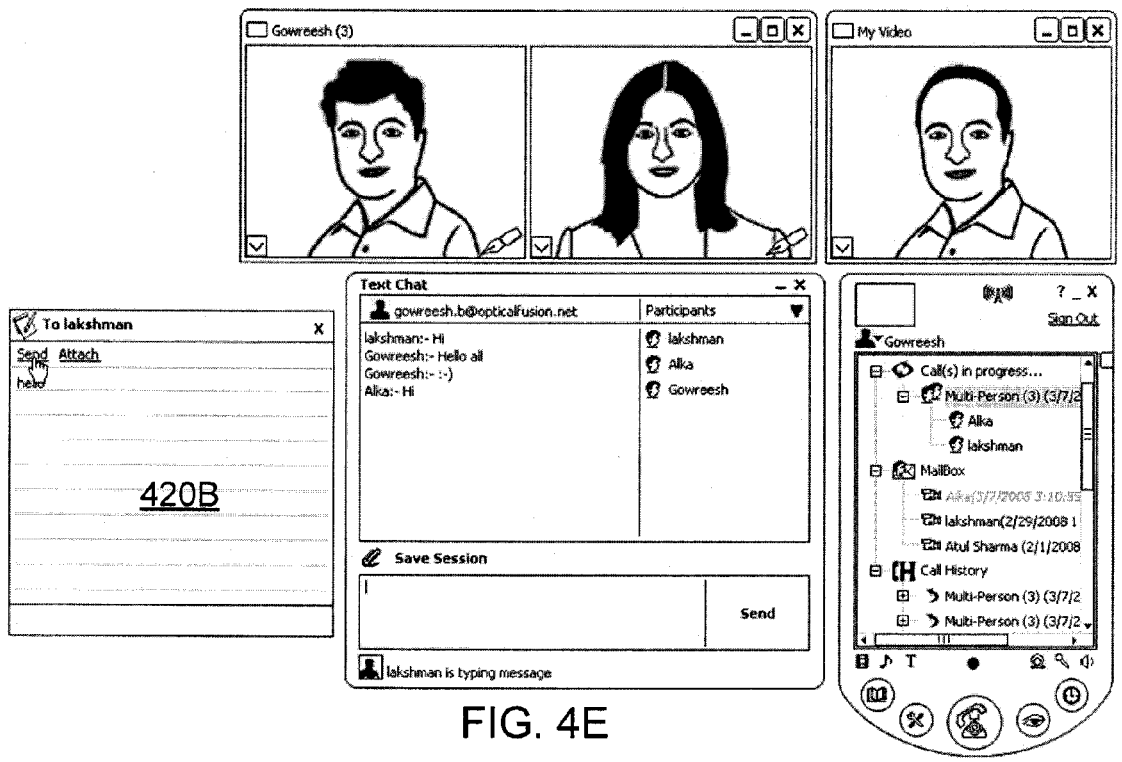

FIGS. 4A-4G illustrate additional features for sending private messages to other participants. In FIG. 4A, a video conference has been established between three participants: Gowreesh, Alka and Lakshman. FIG. 4A shows Gowreesh's communicator. The pen icons 410A, 410B can be used to send private messages to Alka or Lakshman, respectively. When the cursor is over the pen ion 410A, it changes to a pad icon 411A, as shown FIG. 4B. Clicking the pad icon 411A creates a text area 420A for composing a private message to Alka. FIG. 4C shows the private message 420A, which Gowreesh sends to Alka by clicking the Send button. In FIGS. 4D and 4E, Gowreesh sends a private message to Lakshman by activating laskhman's pad icon 411B and then composing and sending the private message 420B. FIG. 4G shows private messages 420C and 420D received by Gowreesh from Alka and Lakshman, respectively.

Figure 4F:
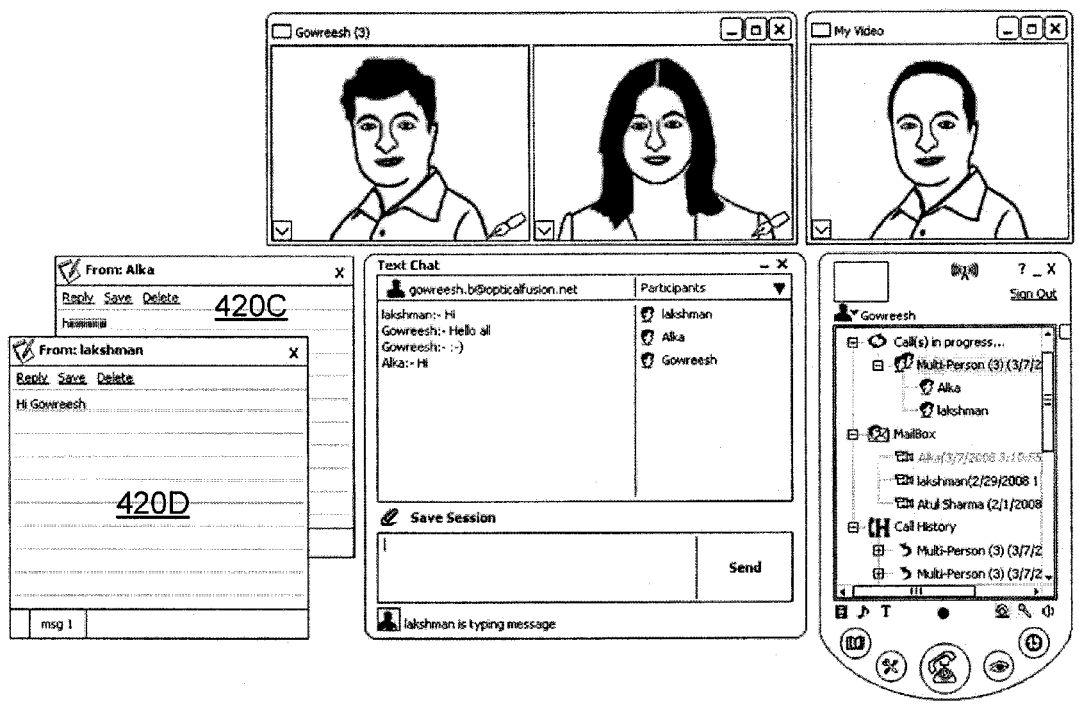

Various features have been implemented for private communications. For example, private messages can be sent with attachments, for example by clicking the Attachment button shown in FIGS. 4C and 4E. As shown in FIG. 4F, received private messages can be Saved or Deleted. FIG. 4F also shows a Reply button to facilitate replying to a private message. Private messages can also be sent to more than one participant. For example, two three-person teams may be negotiating against each other. One person may send a private message to any subset of the others in the conference, for example, say to two other team members. A thread of all private communication exchanged between a party and another (or others) can be maintained at all times. The thread can be cleared by any party. Alternatively it can be saved and then cleared. An option is provided, whereby the user can have settings such that he/she is informed if the party with whom private exchanges are taking place decides to save the thread of exchanges.

Figure 5A:
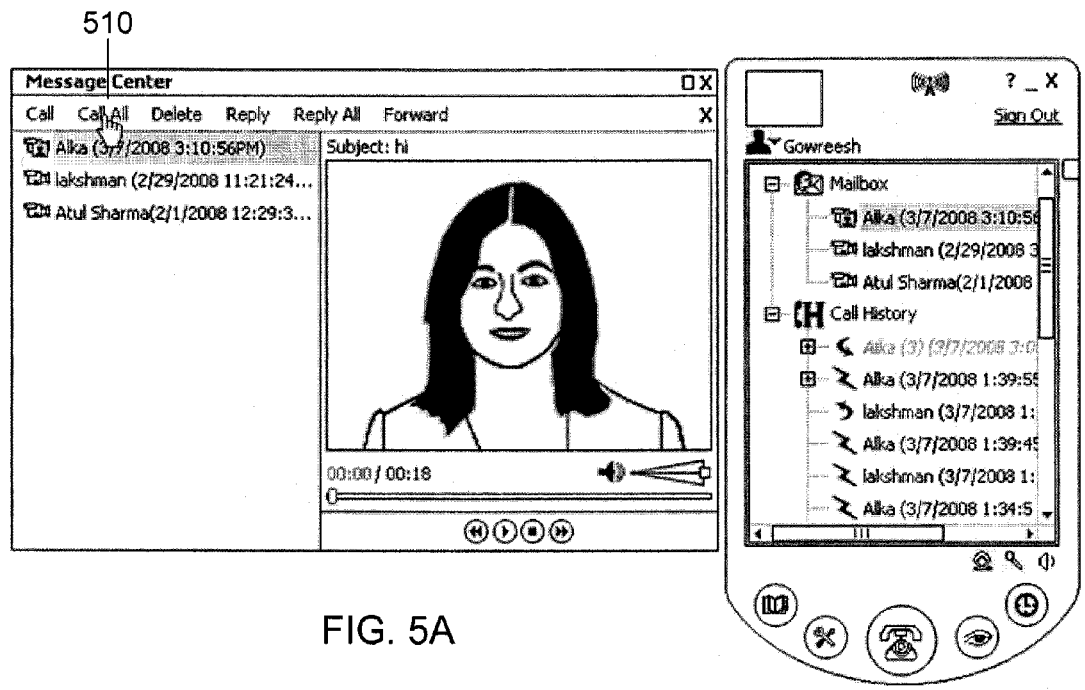
FIGS. 5A-5C are screen shots illustrating a Call All feature.
Figure 5B:
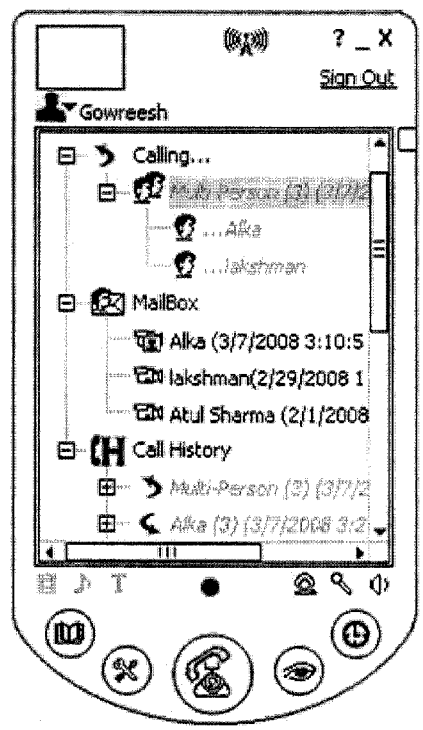
Figure 5C:
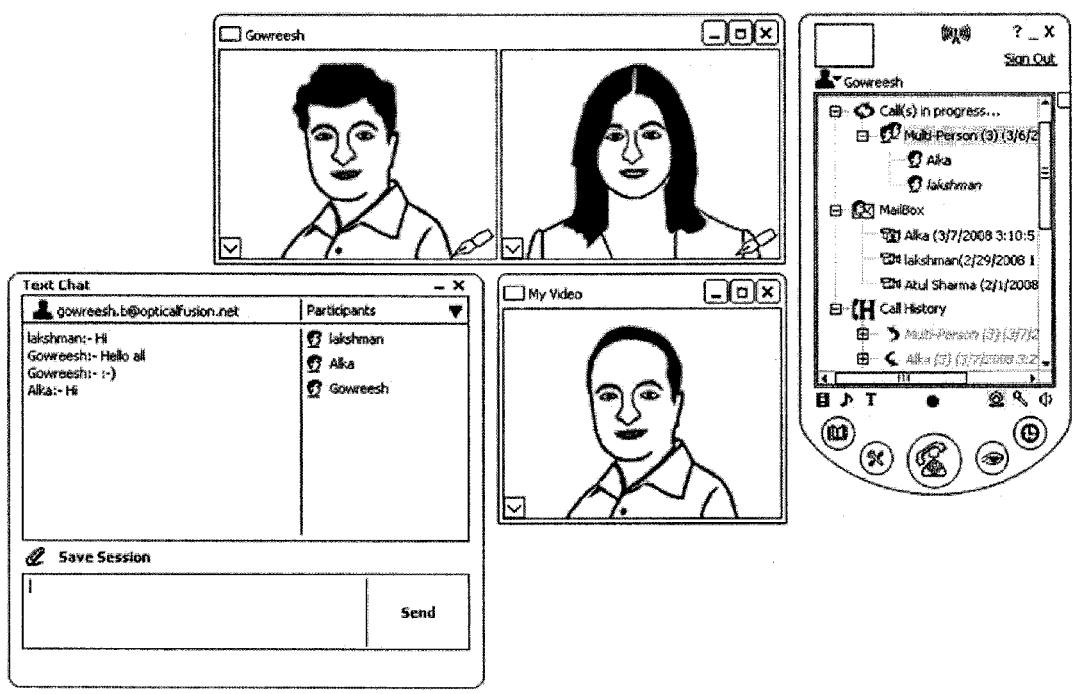

FIGS. 5A-5C and FIGS. 6A-6B are screen shots illustrating a Call All feature and a Reply All feature, respectively. In FIG. 5A, Alka and Lakshman were on a video conference call which was recorded and sent by Alka to Gowreesh. Gowreesh may have been one of the intended participants but was unavailable, or the video conference call simply may have been recorded and sent to Gowreesh. In FIG. 5A, Gowreesh is replaying the video voicemail from Alka. In response, Gowreesh decides he would like to video conference call everyone on the previous call. Therefore, he activates the Call All button 510. This video conference calls Alka and Lakshman, as shown in FIG. 5B. FIG. 5C shows the connected video conference call with all three participants Gowreesh, Alka and Lakshman.

Figure 6A:
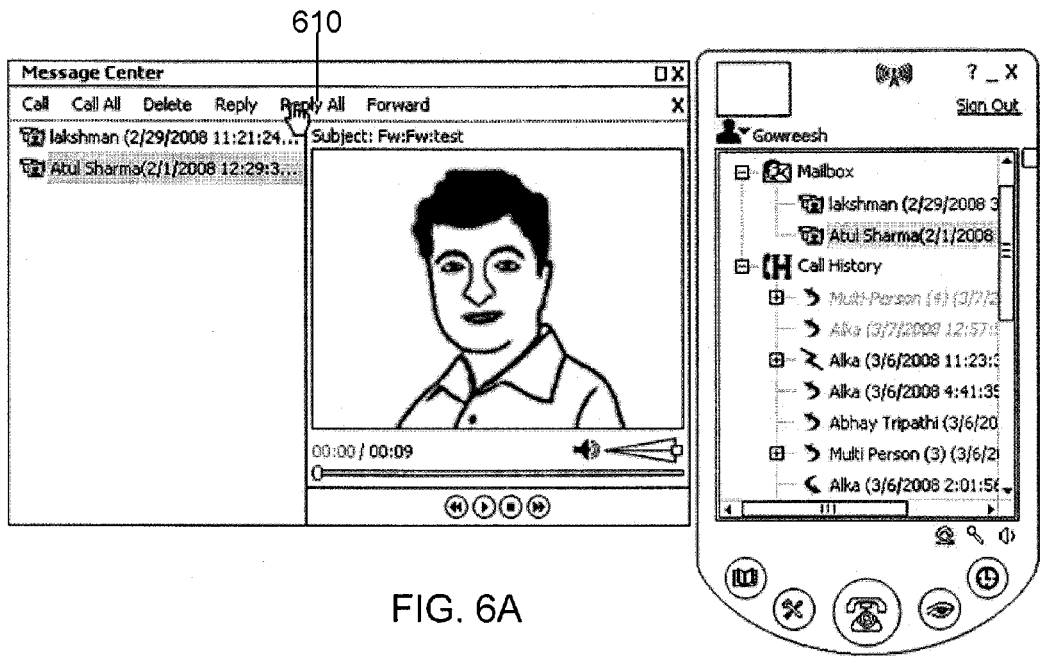
FIGS. 6A-6B are screen shots illustrating a Reply All feature.
Figure 6B:
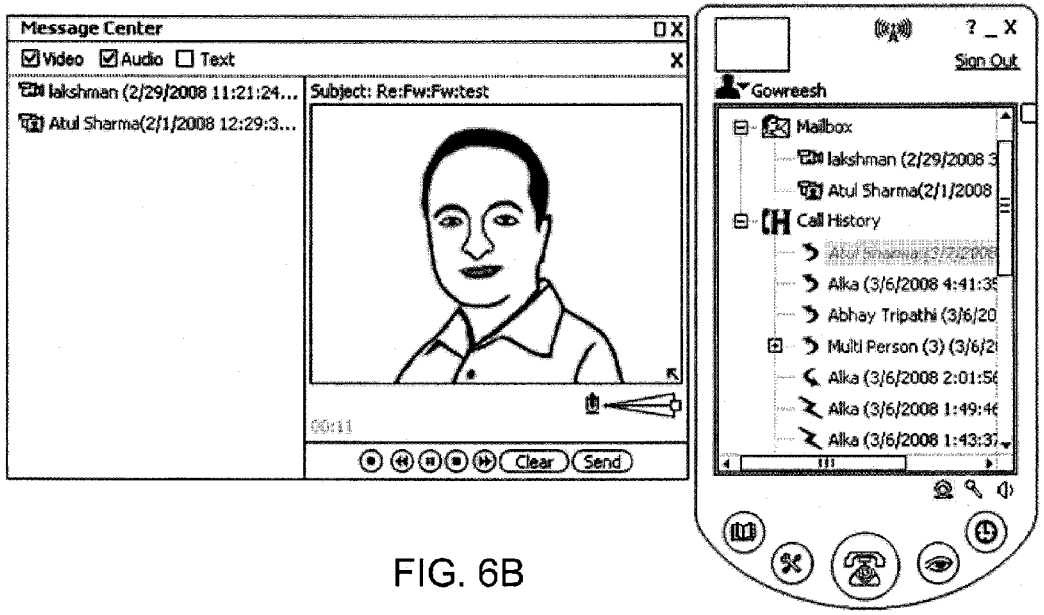

In FIG. 6A, Atul Sharma and Lakshman were on a video conference call, which was recorded and sent as a video voicemail by Atul to Gowreesh. FIG. 6A shows Gowreesh's playback of the video voicemail. Gowreesh decides he would like to reply to everyone on the previous call. Therefore, he activates the Reply All button 610. He can then record a video voicemail, as shown in FIG. 6B, to be sent to both Atul and Lakshman.

In addition to Reply All and Call All, recipients also have the option to Reply or Call just the user that contacted them.

In some cases, the videomail message can be a recording of a video conference. Suppose that a product development team is having a progress meeting. The team leader video conference calls the other four team members. Three of the team members join the video conference but the fourth does not. The video conference can be recorded and sent as a videomail message to the fourth team member. Suppose that the meeting lasts for two hours but the fourth team member is only fifteen minutes late. It would be useful to notify the team member before the entire recording is completed because he could join the video conference in progress and then later play back only the missed first fifteen minutes. As one feature, the videomail message may automatically stop recording the video conference once the fourth team member joins the video conference. Alternately, recording may simply continue. As another option, if another team member left the video conference before the end, the missed segment may be (automatically) recorded as a videomail message for that team member. The "reply all" and "call all" features described above can be useful if the team member wants to contact the other team members.

Recording of video conferences can be useful in its own right, separate from whether the recordings are made in response to a participant's unavailability for a video conference call or whether they are sent as videomail messages versus some other format. In the above example, even if all team members can join the video conference, it may be useful to record the video conference anyways. The recording can be used later to review certain points, or as a historical record, or forwarded to others who were not invited to the video conference. The recorded video conference can be sent to non-registered users in formats other than a videomail message. For example, it could be sent as an attachment to email, or even recorded on a portable medium such as CD, DVD or Blu-ray, for physical distribution. If a video conference is being recorded, it is preferable to notify the participants of the recording. In one approach, participants are given the option to opt out of recording. The video conference then records only those participants who have not opted out. Alternately, only selected participants may be recorded. Whether these features are useful will depend on the application.

It is preferable to record the video conference as separate video streams for different participants. For example, suppose that three people at three different locations are participating in a video conference. Each of them generates a separate video stream. These are routed between the different participants. Participant 1 receives the video and audio streams from participants 2 and 3. The video streams may be displayed in various ways (e.g., a composite display having two windows, one for each of participants 2 and 3) and the audio streams typically are mixed together to produce a single audio stream that is played to participant 1.

The video conference could be recorded by recording the composite display and the mixed audio stream. However, this reduces the flexibility during play back. For example, it will be difficult to boost one person's audio relative to the others. In addition, the composite display and mixed audio stream provided to participant 1 does not include participant 1's video stream or audio stream. Therefore, it is preferable to record the video conference by recording the separate video and audio streams for the participants, before they are combined. On play back, these video and audio streams are sent to the user, the same as preferably occurs during the actual video conference. Accordingly, the user can apply the same controls over the play back as would have been available during the original broadcast of the video conference.

The present invention has been described in particular detail with respect to a limited number of embodiments. One skilled in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDs, DVDs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method for implementing videomail for video conferencing, the method comprising:
 a caller using a computing device to make a video conference call to a first called party;
 in response to the first called party not accepting the video conference call, providing a videomail service that includes;
  recording a videomail message from the caller as sender of the videomail message, to the first called party as recipient of the videomail message;
  notifying the first called party that the first called party has a videomail message; and
  permitting the sender to cancel the recorded videomail message.

2. The computer-implemented method of claim 1 wherein the caller makes the video conference call also to a second called party, the method further comprising:
 initiating a video conference between the caller and the second called party; the step of recording the videomail message including recording the video conference as the videomail message.

3. The computer-implemented method of claim 2 wherein the videomail message includes text chat during the video conference.

4. The computer-implemented method of claim 1 wherein the videomail service permits the sender to send the videomail message to two or more recipients.

5. The computer-implemented method of claim 1 wherein the videomail service permits the sender to edit the recorded videomail message before sending to the recipient.

6. The computer-implemented method of claim 1 further comprising:
 upon cancellation of the recorded videomail message, notifying the first called party that the first called party missed a video conference call.

7. The computer-implemented method of claim 1 further comprising:
 permitting the recipient to forward the videomail message.

8. The computer-implemented method of claim 7 wherein the videomail service further includes:
 permitting the sender to limit the distribution of the videomail message.

9. The computer-implemented method of claim 7 wherein the videomail service further includes:
  permitting the sender to limit the number of times the videomail message is forwarded.

10. The computer-implemented method of claim 1 wherein the videomail service further includes:
  permitting the sender to limit a lifetime of the videomail message.

11. The computer-implemented method of claim 1 wherein the videomail service further includes:
  permitting the sender to set permissions for the videomail message.

12. The computer-implemented method of claim 1 wherein the first called party is notified before recording of the videomail message has been completed.

13. The computer-implemented method of claim 12 further comprising:
  in response to a request from the first called party, playing back the videomail message to the first called party, the play back beginning before recording of the videomail message has been completed.

14. A graphical user interface for display and/or play back of videomail messages for video conferencing, the graphical user interface comprising:
  a main communicator element that includes top-level controls for video conferencing; and
  a message center that identifies received videomail messages, at least some of the videomail messages generated in connection with video conferencing activities, the videomail messages played back within a playback window upon selection from the message center, wherein the message center can be docked or undocked, the message center displayed within the main communicator element when docked and displayed in a window separate from the main communicator element when undocked.

15. The graphical user interface of claim 14 wherein the playback window can be docked or undocked, the playback window displayed within the main communicator element when docked and displayed in a window separate from the main communicator element when undocked.

16. The graphical user interface of claim 15 wherein selecting a videomail message for play back automatically undocks the playback window for that videomail message.

17. The graphical user interface of claim 14 further comprising:
  a user input element that, when activated, permits the recipient to reply all to the other addressees on the videomail message.

18. The graphical user interface of claim 14 further comprising:
  a user input element that, when activated, permits the recipient to initiate a video conference with the other addressees on the videomail message.

19. A computer-implemented method for recording video conferencing as videomail messages, the method comprising:
  receiving a video conference call from a caller to called party;
  using a computing device to initiate a video conference between the caller and the called party;
  recording the participants in the video conference who have agreed to the recording;
  storing the recorded video conference; and
  sending the recorded video conference as a videomail message to a recipient.

20. The computer-implemented method of claim 19 wherein the step of sending the recorded video conference as a videomail message to a recipient comprises:
  storing the recorded video conference at a central server; and
  sending to the recipient a notification of the recorded video conference.

21. The computer-implemented method of claim 19 wherein the step of recording the video conference includes notifying participants in the video conference that the video conference is being recorded.

22. The computer-implemented method of claim 21 wherein the step of recording the video conference includes recording only those participants in the video conference who have agreed to recording.

23. The computer-implemented method of claim 19 wherein the step of recording the video conference includes recording text chat during the video conference.

24. The computer-implemented method of claim 19 wherein the step of recording the video conference includes:
  selecting which participants in the video conference to record; and
  recording only the selected participants.

25. The computer-implemented method of claim 19 wherein the step of recording the video conference includes recording a separate video stream for different participants in the video conference.

26. The computer-implemented method of claim 19 wherein the step of recording the video conference includes recording a separate audio stream for different participants in the video conference.

27. The computer-implemented method of claim 19 wherein the step of recording the video conference includes recording private messages sent between participants during the video conference.

28. The computer-implemented method of claim 19 further comprising:
  playing back the videomail message.

29. The computer-implemented method of claim 28 wherein the recipient has the same controls over play back of the videomail message as would have been available for original broadcast of the video conference.

30. A computer-implemented method for implementing video conferencing, the method comprising:
  a caller using a computing device to make a video conference call to at least two called parties;
  at least two of the called parties accepting the video conference call;
  initiating a video conference, with the caller and the accepting called parties as participants;
  receiving a request from one of the participants to send a private message to another participant;
  sending the private message from the requesting participant to the receiving participant without notifying the other participants;
  permitting the private message to be saved by the requesting participant or the receiving participant; and
  notifying the requesting participant, the receiving participant, or both that the private message has been saved.

* * * * *